(12) United States Patent
Ludlow et al.

(10) Patent No.: US 12,442,471 B2
(45) Date of Patent: Oct. 14, 2025

(54) MULTILAYER TUBING FOR CHEMICAL TRANSFER APPLICATIONS

(71) Applicant: SAINT-GOBAIN PERFORMANCE PLASTICS CORPORATION, Solon, OH (US)

(72) Inventors: James Ludlow, Medina, OH (US); Morgan D. Heskett, Akron, OH (US); Mark F. Colton, Rootstown, OH (US); Michael J. Tzivanis, Chicopee, MA (US)

(73) Assignee: SAINT-GOBAIN PERFORMANCE PLASTICS CORPORATION, Malvern, PA (US)

( * ) Notice: Subject to any disclaimer, the term of this patent is extended or adjusted under 35 U.S.C. 154(b) by 39 days.

(21) Appl. No.: 17/457,111

(22) Filed: Dec. 1, 2021

(65) Prior Publication Data
US 2022/0170574 A1 Jun. 2, 2022

Related U.S. Application Data

(60) Provisional application No. 63/119,730, filed on Dec. 1, 2020.

(51) Int. Cl.
*F16L 11/12* (2006.01)
*B32B 1/08* (2006.01)
(Continued)

(52) U.S. Cl.
CPC ............... *F16L 11/12* (2013.01); *B32B 1/08* (2013.01); *B32B 27/08* (2013.01); *B32B 27/22* (2013.01);
(Continued)

(58) Field of Classification Search
CPC . F16L 11/12; B32B 1/08; B32B 27/08; B32B 27/22; B32B 27/304; B32B 27/40; B32B 37/153; B32B 2307/70
(Continued)

(56) References Cited

U.S. PATENT DOCUMENTS

| 3,528,457 A | 9/1970 | Martin et al. |
| 4,291,099 A | 9/1981 | Strassel |

(Continued)

FOREIGN PATENT DOCUMENTS

| CA | 2303472 A1 | 9/2001 |
| CN | 102015278 A | 4/2011 |

(Continued)

OTHER PUBLICATIONS

The Engineering Society for Advancing Mobility Land Sea Air and Space International, "Surface Vehicle Recommended Practice", Aug. 1997, Revised Nov. 2004, 31 pages.
(Continued)

*Primary Examiner* — David R Deal
(74) *Attorney, Agent, or Firm* — Abel Schillinger, LLP; Chi Suk Kim

(57) ABSTRACT

Systems and methods are disclosed that include providing a multilayer tubing construction with an inner layer, an intermediate layer, and an outer or third layer formed from a material comprising a non-phthalate plasticizer, such as TOTM, DOA, DOTP, or combinations thereof. The multilayer tubing may be suitable for carrying a fuel, or other flammable substances therethrough, and resists delamination between layers when exposed to high humidity climates.

18 Claims, 3 Drawing Sheets

(51) Int. Cl.
  *B32B 27/08* (2006.01)
  *B32B 27/22* (2006.01)
  *B32B 27/30* (2006.01)
  *B32B 27/40* (2006.01)
  *B32B 37/15* (2006.01)

(52) U.S. Cl.
  CPC ............ *B32B 27/304* (2013.01); *B32B 27/40* (2013.01); *B32B 37/153* (2013.01); *B32B 2307/70* (2013.01); *B32B 2597/00* (2013.01)

(58) Field of Classification Search
  USPC ........................................................ 138/137
  See application file for complete search history.

(56) References Cited

U.S. PATENT DOCUMENTS

| | | | |
|---|---|---|---|
| 4,627,844 A * | 12/1986 | Schmitt | A61M 25/0045 428/36.6 |
| 4,640,313 A | 2/1987 | Stanley | |
| 4,997,955 A | 3/1991 | Merger et al. | |
| 5,324,588 A * | 6/1994 | Rinehart | B32B 27/08 428/458 |
| 5,349,989 A | 9/1994 | Legallais | |
| 5,356,710 A * | 10/1994 | Rinehart | B32B 27/304 428/476.1 |
| 5,419,374 A | 5/1995 | Nawrot et al. | |
| 6,140,417 A | 10/2000 | Nakanishi et al. | |
| 6,142,189 A | 11/2000 | Bhattacharyya | |
| 6,261,657 B1 * | 7/2001 | Ainsworth | B32B 25/08 428/480 |
| 6,263,920 B1 | 7/2001 | Hsieh et al. | |
| 6,555,243 B2 | 4/2003 | Flepp et al. | |
| 6,807,988 B2 | 10/2004 | Powell et al. | |
| 8,092,881 B2 | 1/2012 | Garver et al. | |
| 8,679,609 B2 | 3/2014 | Garver et al. | |
| 9,056,447 B2 | 6/2015 | O'Brien et al. | |
| 9,481,633 B2 | 11/2016 | Chaudhary et al. | |
| 9,528,637 B2 | 12/2016 | Garver et al. | |
| 9,772,052 B2 | 9/2017 | Garver et al. | |
| 10,106,486 B2 | 10/2018 | Kaller et al. | |
| 2004/0069361 A1 | 4/2004 | Cheng et al. | |
| 2004/0126532 A1 * | 7/2004 | Gardner, Jr. | B29C 37/0057 428/43 |
| 2005/0084640 A1 * | 4/2005 | Bilodeau | C09J 7/50 428/40.1 |
| 2005/0113234 A1 | 5/2005 | Eagles et al. | |
| 2005/0170121 A1 | 8/2005 | Bonnet et al. | |
| 2005/0170122 A1 | 8/2005 | Fahrenholz et al. | |
| 2006/0112998 A1 | 6/2006 | Smith | |
| 2007/0125438 A1 | 6/2007 | Hardy et al. | |
| 2008/0003389 A1 | 1/2008 | Hoffmann et al. | |
| 2009/0130357 A1 | 5/2009 | Seyler | |
| 2009/0301595 A1 | 12/2009 | Bonnet et al. | |
| 2010/0021665 A1 * | 1/2010 | Jackson | B32B 27/308 138/137 |
| 2010/0282355 A1 | 11/2010 | Seyler et al. | |
| 2012/0213958 A1 * | 8/2012 | Golub | C08J 3/18 428/36.9 |
| 2012/0258303 A1 * | 10/2012 | Buhring | B32B 27/12 156/244.11 |
| 2015/0170788 A1 | 6/2015 | Miller et al. | |
| 2017/0158533 A1 * | 6/2017 | Kwan | C08L 27/06 |
| 2018/0231152 A1 * | 8/2018 | Clark | B32B 25/02 |
| 2021/0116057 A1 * | 4/2021 | Meng | A61L 29/06 |

FOREIGN PATENT DOCUMENTS

| | | | |
|---|---|---|---|
| DE | 1650138 A1 | 9/1970 | |
| EP | 0003449 A1 | 8/1979 | |
| EP | 0558373 A2 | 9/1993 | |
| EP | 1537989 A1 | 6/2005 | |
| EP | 1754919 A1 | 2/2007 | |
| FR | 2436676 A1 | 4/1980 | |
| JP | S60236749 A | 11/1985 | |
| JP | S60236750 A | 11/1985 | |
| JP | 62253428 A | 11/1987 | |
| JP | H06281056 A | 10/1994 | |
| JP | H08142151 A | 6/1996 | |
| JP | H08336942 A | 12/1996 | |
| JP | H1061833 A | 3/1998 | |
| JP | H1082483 A | 3/1998 | |
| JP | H11151768 A | 6/1999 | |
| JP | 3059736 B2 | 7/2000 | |
| JP | 2001074174 A | 3/2001 | |
| JP | 2001108163 A | 4/2001 | |
| JP | 2001248764 A | 9/2001 | |
| JP | 2006096918 A | 4/2006 | |
| JP | 2007236782 A | 9/2007 | |
| JP | 2010269576 A | 12/2010 | |
| JP | 2011518300 A | 6/2011 | |
| JP | 2012025851 A | 2/2012 | |
| JP | 2012255104 A | 12/2012 | |
| WO | 9704264 A1 | 2/1997 | |
| WO | 0106163 A1 | 1/2001 | |
| WO | 2007122335 A1 | 11/2007 | |
| WO | 2008005744 A2 | 1/2008 | |
| WO | 2009135112 A2 | 11/2009 | |
| WO | WO-2021100025 A1 * | 5/2021 | ............ B29C 51/12 |

OTHER PUBLICATIONS

International Search Report and Written Opinion for PCT/US2009/042500, mailed Dec. 16, 2009, 7 pages.

\* cited by examiner

MULTILAYER TUBING FOR CHEMICAL TRANSFER APPLICATIONS

CROSS-REFERENCE TO RELATED APPLICATION(S)

This application claims priority under 35 U.S.C. § 119(e) to U.S. Provisional Application No. 63/119,730, entitled "MULTILAYER TUBING FOR CHEMICAL TRANSFER APPLICATIONS," by James LUDLOW et al., filed Dec. 1, 2020, which is assigned to the current assignee hereof and incorporated herein by reference in its entirety.

BACKGROUND OF THE INVENTION

Chemical transfer tubing, such as tubing used for the transport of fuels, often requires a cost effective combination of chemical resistance and flexibility. These requirements remain difficult to balance, since chemically resistant materials, such as fluoropolymers, typically have a high modulus of elasticity and are relatively expensive, and flexible, inexpensive materials, such as plasticized PVC, have limited chemical resistance. To balance these requirements, multilayer tubing constructions are often utilized to meet the demanding application requirements of low fuel permeation, flexibility, fitting retention, and UV resistance. However, traditional multilayer tubing constructions can delaminate when exposed to high humidity conditions.

BRIEF DESCRIPTION OF THE DRAWINGS

So that the manner in which the features and advantages of the embodiments are attained and can be understood in more detail, a more particular description may be had by reference to the embodiments thereof that are illustrated in the appended drawings. However, the drawings illustrate only some embodiments and therefore are not to be considered limiting in scope as there may be other equally effective embodiments.

The use of the same reference symbols in different drawings indicates similar or identical items.

DETAILED DESCRIPTION

Figure 1:
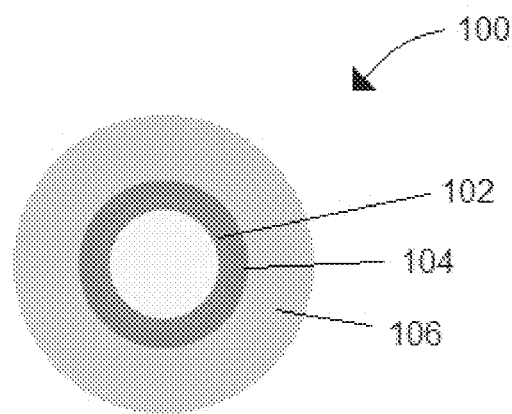
FIG. 1 is a cross-sectional view of a multilayer tubing construction according to an embodiment of the disclosure.

FIG. 1 shows a cross-sectional view of a multilayer tubing construction 100 according to an embodiment of the disclosure. The multilayer tubing construction 100 may comprise an inner layer 102, an intermediate layer 104, and an outer or third layer 106. The multilayer tubing construction 100 may generally be suitable for automotive, marine, or other applications requiring the transport of fuels. As such, each of the layers 102, 104, 106 may be formed from a material having specific properties. The inner layer 102 may be configured to carry a fuel through a lumen formed in the inner layer 102. To control and/or prevent the amount of fuel and/or fuel vapors that may escape or seep from the inner layer 102, the inner layer may be formed from a fuel resistant material. In some embodiments, the fuel resistant material may comprise a fluoropolymer. In some embodiments, the fuel resistant material may be a polyvinylidene difluoride (PVDF) polymer, a PVDF copolymer, a terpolymer such as THV, or any other suitable fuel resistant material. In some embodiments, the intermediate layer 104 may be formed from a thermoplastic polyurethane (TPU), an ethylene acrylate copolymer such as Lotader® AX8900, PVDF, THV, a PVDF/THV copolymer, or any other suitable, or any other suitable tie layer material. In some embodiments, the outer or third layer 106 may be formed from polyvinyl chloride (PVC), a plasticized PVC material, a humidity resistant PVC, an oil resistant PVC, a TPU, or other suitable material.

PVC materials often include a plasticizer and/or a stabilizer, which may improve the flexibility and/or durability of the PVC material. However, traditional PVC materials having a phthalate and/or phthalate ester plasticizer, or an aliphatic polyester plasticizer such as [poly(1,4-butylene adipate)], may not be suitable for operation in high humidity conditions, due to the propensity of the plasticizer to leech out or exude from the PVC. When this occurs, the PVC material may shrink, thereby causing delamination in traditional multilayer tubing constructions. PVC materials having a suitable plasticizer may inhibit, reduce, and/or altogether prevent the delamination of the layers in a multilayer tubing construction. Accordingly, in some embodiments, the outer or third layer 106 may be formed from PVC comprising a non-phthalate plasticizer. In some embodiments, the non-phthalate plasticizer may comprise trioctyl trimellitate (TOTM), dioctyl adipate (DOA), dioctyl terephthalate (DOTP), or combinations thereof. Further, in some embodiments, the outer or third layer 106 may be formed from PVC that is free of a phthalate and/or phthalate ester plasticizer or an aliphatic polyester plasticizer such as [poly(1,4-butylene adipate)].

In some embodiments, the non-phthalate plasticizer may comprise at least 10 wt. %, at least 15 wt. %, at least 20 wt. %, at least 25 wt. %, at least 30 wt. %, at least 35 wt. %, at least 40 wt. %, at least 45 wt. %, at least 50 wt. %, at least 55 wt. %, or at least 60 wt. % of the total weight of the outer or third layer 106. In some embodiments, the non-phthalate plasticizer may comprise not greater than 95 wt. %, not greater than 90 wt. %, not greater than 85 wt. %, not greater than 80 wt. %, not greater than 75 wt. %, not greater than 70 wt. %, not greater than 65 wt. %, not greater than 60 wt. %, not greater than 55 wt. %, not greater than 50 wt. %, not greater than 45 wt. %, or not greater than 40 wt. % of the total weight of the outer or third layer 106. Further, it will be appreciated that the non-phthalate plasticizer may comprise a weight percentage between any of these minimum and maximum values, such as at least 10% to not greater than 95%, or even at least 30% to not greater than 60%.

As stated, traditional PVC materials having a phthalate and/or phthalate ester plasticizer or an aliphatic polyester plasticizer such as [poly(1,4-butylene adipate)], may not be suitable for operation in high humidity conditions, due to the propensity of the plasticizer to leech out or exude from the PVC. However, due to the outer or third layer 106 comprising a suitable non-phthalate plasticizer, such as trioctyl trimellitate (TOTM), dioctyl adipate (DOA), dioctyl terephthalate (DOTP), or combinations thereof, the amount of plasticizer that leeches from the outer or third layer 106 may be reduced and/or altogether prevented as compared to traditional PVC materials having a phthalate and/or phthalate ester plasticizer or an aliphatic polyester plasticizer such as [poly(1,4-butylene adipate)]. In some embodiments, not greater than 50%, not greater than 45%, not greater than 40%, not greater than 35%, not greater than 30%, not greater than 25%, not greater than 20%, not greater than 15%, not greater than 10%, not greater than 5%, not greater than 4%, not greater than 3%, not greater than 2%, not greater than 1%, or not greater than 0.5% of the non-phthalate plasticizer may leech from the outer or third layer 106 when the multilayer tubing construction 100 is exposed to high humidity conditions for a predetermined period of time. In some embodiments, none of the non-phthalate plasticizer may leech from the outer or third layer 106 when the multilayer tubing construction 100 is exposed to high humidity conditions for a predetermined period of time.

If any amount of plasticizer leeches from the outer or third layer 106 when the multilayer tubing construction 100 is exposed to high humidity conditions, the outer or third layer 106 may experience a reduction in the total weight of the outer or third layer 106. In some embodiments, the reduction in the total weight of the outer or third layer 106 attributed to the non-phthalate plasticizer leeching from the outer or third layer 106 when the multilayer tubing construction 100 is exposed to high humidity conditions for a predetermined period of time may be not greater than 25%, not greater than 20%, not greater than 15%, not greater than 10%, not greater than 9%, not greater than 8%, not greater than 7%, not greater than 6%, not greater than 5%, not greater than 4%, not greater than 3%, not greater than 2%, not greater than 1%, or not greater than 0.5%. In some embodiments, there may be no reduction in the total weight of the outer or third layer 106 when the multilayer tubing construction 100 is exposed to high humidity conditions for a predetermined period of time.

If any amount of plasticizer leeches from the outer or third layer 106 when the multilayer tubing construction 100 is exposed to high humidity conditions, the outer or third layer 106 may experience a change in the glass transition temperature (Tg) of the outer or third layer 106. In some embodiments, the change in the glass transition temperature (Tg) of the outer or third layer 106 may be not greater than 40 degrees Celsius, not greater than 35 degrees Celsius, not greater than 30 degrees Celsius, not greater than 25 degrees Celsius, not greater than 20 degrees Celsius, not greater than 15 degrees Celsius, not greater than 10 degrees Celsius, or not greater than 5 degrees Celsius when the multilayer tubing construction 100 is exposed to high humidity conditions for a predetermined period of time. In some embodiments, there may be no change in the glass transition temperature (Tg) of the outer or third layer 106 when the multilayer tubing construction 100 is exposed to high humidity conditions for a predetermined period of time.

Due to the outer or third layer 106 comprising a suitable non-phthalate plasticizer, such as trioctyl trimellitate (TOTM), dioctyl adipate (DOA), dioctyl terephthalate (DOTP), or combinations thereof, the non-phthalate plasticizer may prevent delamination between the layers 102, 104, 106 when the multilayer tubing construction 100 is exposed to high humidity conditions for a predetermined period of time, thereby providing increased durability and extended life as compared to traditional PVC materials having a phthalate and/or phthalate ester plasticizer or an aliphatic polyester plasticizer such as [poly(1,4-butylene adipate)]. Further, as disclosed herein, the high humidity conditions may comprises at least 60% relative humidity (RH), at least 65% RH, at least 70% RH, or at least 75% RH at a temperature of at least 30 degrees Celsius, at least 40 degrees Celsius, at least 50 degrees Celsius, at least 60 degrees Celsius, or at least 70 degrees Celsius, and the predetermined period of time may be at least 60 days, at least 75 days, at least 90 days, at least 120 days, at least 180 days, at least 1 year, at least 2 years, at least 3 years, at least 4 years, at least 5 years, or at least 10 years.

In some embodiments, the inner layer 102, the intermediate layer 104, and/or the outer or third layer 106 that form the multilayer tubing construction 100 may be coextruded. Furthermore, it will be appreciated that the multilayer tubing construction 100 may comprise a peel force suitable for use in automotive, marine, or other applications requiring the transport of fuels. In some embodiments, the multilayer tubing construction 100 may comprise a peel force of at least 6 pounds per inch (lb./in.), at least 7 lb./in., at least 8 lb./in., at least 9 lb./in., at least 10 lb./in., at least 11 lb./in., or at least 12 lb./in.

Figure 2:
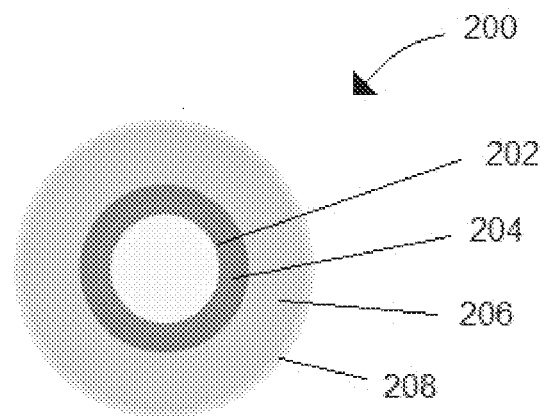
FIG. 2 is a cross-sectional view of a multilayer tubing construction according to an embodiment of the disclosure.

FIG. 2 shows a cross-sectional view of a multilayer tubing construction 200 according to an embodiment of the disclosure. The multilayer tubing construction 200 may generally be substantially similar to the multilayer tubing construction 100 and comprise an inner layer 202, an intermediate layer 204, and an outer or third layer 206 that are substantially similar to the inner layer 102, the intermediate layer 104, and the outer or third layer 106 of the multilayer tubing construction 100, respectively. However, the multilayer tubing construction 200 comprises a fourth layer 208 disposed over the outer or third layer 206. In some embodiments, the fourth layer 208 may be coextruded with the inner layer 202, the intermediate layer 204, and the outer or third layer 206.

In some embodiments, the fourth layer 208 may be formed from an oil resistant material. In some embodiments, the oil resistant material may be an oil resistant plasticized PVC material, a humidity resistant PVC, or any other suitable material such as a thermoplastic polyurethane (TPU), a thermoplastic elastomer (TPE), a co-polyester thermoplastic elastomer (COPE), or a copolyamide thermoplastic elastomer (COPA). In some embodiments, the fourth layer 208 may be formed from a material that gives the multilayer tubing construction 200 a specific appearance. For example, the material of the fourth layer 208 may be selected based on the material having a preferred color. In other embodiments, the material of the fourth layer 208 may be selected based on the material having a preferred color that allows markings on the outside of the multilayer tubing construction 200 to be readily visible. Such colors or markings may relate to one or more operational parameters and/or specific applications for the multilayer tubing construction 200.

It will be appreciated that the multilayer tubing construction 100, 200 is suitable for use in automotive, marine, or other applications requiring the transport of fuels through the inner layer 102, 202. Accordingly, the inner layer 102, 202 may comprise a fuel evaporation rate of less than 20 grams per square meter per day ($g/m^2/day$), less than 15 $g/m^2/day$, less than 10 $g/m^2/day$, less than 9 $g/m^2/day$, less than 8 $g/m^2/day$, less than 7 $g/m^2/day$, less than 6 $g/m^2/day$, less than 5 $g/m^2/day$, less than 4 $g/m^2/day$, or even less than 3 $g/m^2/day$. In some embodiments, the material and/or wall thickness of the inner layer 102, 202 may be selected based on the particular fuel evaporation rate requirement of a particular application.

Furthermore, it will be appreciated that the multilayer tubing construction 200 may comprise a peel force suitable for use in automotive, marine, or other applications requiring the transport of fuels. In some embodiments, the multilayer tubing construction 200 may comprise a peel force of at least 6 pounds per inch (lb./in.), at least 7 lb./in., at least 8 lb./in., at least 9 lb./in., at least 10 lb./in., at least 11 lb./in., or at least 12 lb./in.

In some embodiments, each of the layers 102, 104, 106, 202, 204, 206 may comprise a wall thickness that makes the multilayer tubing construction 100, 200 suitable for automotive, marine, or other applications requiring the transport of fuels. In some embodiments, the inner layer 102, 202 may comprise a wall thickness of at least 0.003 inches, at least 0.004 inches, at least 0.005 inches, at least 0.006 inches, at least 0.007 inches, at least 0.0008 inches, at least 0.009 inches, or at least 0.010 inches. For example, in particular embodiments, the inner layer 102, 202 may comprise a wall thickness of 0.003 inches for application requiring less than 15 g/m2, 0.007 inches, 0.011 inches, or 0.021 inches.

In some embodiments, the material and/or the wall thickness of the inner layer 102, 202 may be selected based on the particular fuel evaporation rate requirement of a particular application. For example, in some embodiments, the inner layer 102, 202 may comprise a polyvinylidene difluoride (PVDF) polymer or a PVDF copolymer having a wall thickness of at least 0.011 inches for an application requiring a fuel evaporation rate of less than 15 g/m$^2$/day. In some embodiments, the inner layer 102, 202 may comprise a polyvinylidene difluoride (PVDF) polymer or a PVDF copolymer having a wall thickness of at least 0.021 inches for an application requiring a fuel evaporation rate of less than 5 g/m$^2$/day. In some embodiments, the inner layer 102, 202 may comprise a terpolymer such as THV having a wall thickness of at least 0.003 inches for an application requiring a fuel evaporation rate of less than 15 g/m$^2$/day. In some embodiments, the inner layer 102, 202 may comprise a terpolymer such as THV having a wall thickness of at least 0.007 inches for an application requiring a fuel evaporation rate of less than 5 g/m$^2$/day.

In some embodiments, the intermediate layer 104, 204 may comprise a wall thickness of at least 0.0005 inches, at least 0.001 inches, at least 0.0015 inches, at least 0.002 inches, at least 0.0025 inches, or at least 0.003 inches. For example, in particular embodiments, the intermediate layer 104, 204 may comprise a wall thickness of 0.002 inches, or 0.003 inches. In some embodiments, the outer or third layer 106, 206 may comprise a wall thickness of at least 0.05 inches, at least 0.10 inches, at least 0.11 inches, at least 0.12 inches, at least 0.13 inches, at least 0.14 inches, or at least 0.15 inches. For example, in particular embodiments, the outer or third layer 106, 206 may comprise a wall thickness of 0.11 inches.

The multilayer tubing construction 100, 200 may further comprise dimensions that make the multilayer tubing construction 100, 200 suitable for automotive, marine, or other applications requiring the transport of fuels. In some embodiments, the multilayer tubing construction 100, 200 may comprise an inner diameter of at least 0.125 inches, at least 0.25 inches, at least 0.375 inches, or at least 0.50 inches. In some embodiments, the multilayer tubing construction 100, 200 may comprise an outer diameter of at least 0.25 inches, at least 0.50 inches, at least 0.75 inches, or at least 1.0 inches. For example, in particular embodiments, the multilayer tubing construction 100, 200 may comprise an inner diameter of 0.315 inches and an outer diameter of 0.545 inches.

In one exemplary embodiment, the multilayer tubing construction 100, 200 may comprise an inner layer 102, 202 formed from a polyvinylidene difluoride (PVDF) polymer and having a wall thickness of 0.011 inches for applications requiring a fuel evaporation rate of less than 15 g/m$^2$/day or a wall thickness of 0.021 inches a fuel evaporation rate of less than 5 g/m$^2$/day, an intermediate layer 104, 204 formed from a thermoplastic polyurethane (TPU) and having a wall thickness of 0.003 inches, an outer or third layer 106, 206 formed from a polyvinyl chloride (PVC) material comprising a non-phthalate plasticizer such as trioctyl trimellitate (TOTM), dioctyl adipate (DOA), dioctyl terephthalate (DOTP), or combinations thereof, and optionally a fourth layer 208 formed from a PVC material.

In another exemplary embodiment, the multilayer tubing construction 100, 200 may comprise an inner layer 102, 202 formed from a terpolymer such as THV and having a wall thickness of 0.003 inches for applications requiring a fuel evaporation rate of less than 15 g/m$^2$/day or a wall thickness of 0.007 inches a fuel evaporation rate of less than 5 g/m$^2$/day, an intermediate layer 104, 204 formed from an ethylene acrylate copolymer such as Lotader® AX8900 and having a wall thickness of 0.002 inches, an outer or third layer 106, 206 formed from a polyvinyl chloride (PVC) material comprising a non-phthalate plasticizer such as trioctyl trimellitate (TOTM), dioctyl adipate (DOA), dioctyl terephthalate (DOTP), or combinations thereof, and optionally a fourth layer 208 formed from a PVC material.

In another exemplary embodiment, the multilayer tubing construction 100, 200 may comprise an inner layer 102, 202 formed from a terpolymer such as THV and having a wall thickness of 0.003 inches for applications requiring a fuel evaporation rate of less than 15 g/m$^2$/day or a wall thickness of 0.007 inches a fuel evaporation rate of less than 5 g/m$^2$/day, an intermediate layer 104, 204 formed from a PVDF/THV copolymer and having a wall thickness of 0.002 inches, an outer or third layer 106, 206 formed from a thermoplastic polyurethane (TPU), and optionally a fourth layer 208 formed from a PVC material.

Figure 3:
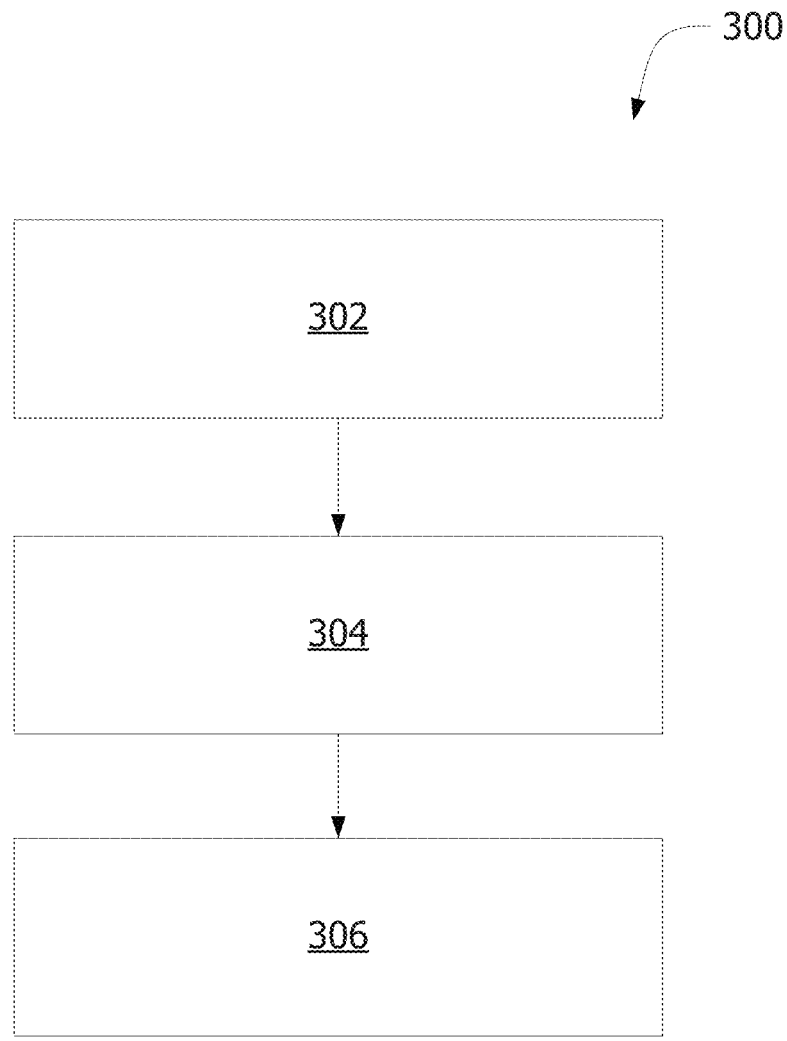
FIG. 3 is a flowchart of a method of forming a multilayer tubing construction according to an embodiment of the disclosure.

FIG. 3 shows a flowchart of a method 300 of forming a multilayer tubing construction 100, 200 according to an embodiment of the disclosure. The method 300 may begin at block 302 by extruding an inner layer 102, 202 of a polyvinylidene difluoride (PVDF) polymer or copolymer. The method 300 may continue at block 304 by coextruding an intermediate layer 104, 204 of a thermoplastic polyurethane (TPU) over the inner layer 102, 202. The method 300 may continue at block 306 by coextruding an outer or third layer 106, 206 of a polyvinyl chloride (PVC) comprising a non-phthalate plasticizer over the intermediate layer 104, 204. Further, in some embodiments, the method 300 may comprise coextruding a fourth layer 208 over the outer or third layer 106, 206. Accordingly, it will be appreciated that any of the layers 102, 104, 106, 202, 204, 206, 208 may be coextruded to form the multilayer tubing construction 100, 200.

Examples

Figure 4:
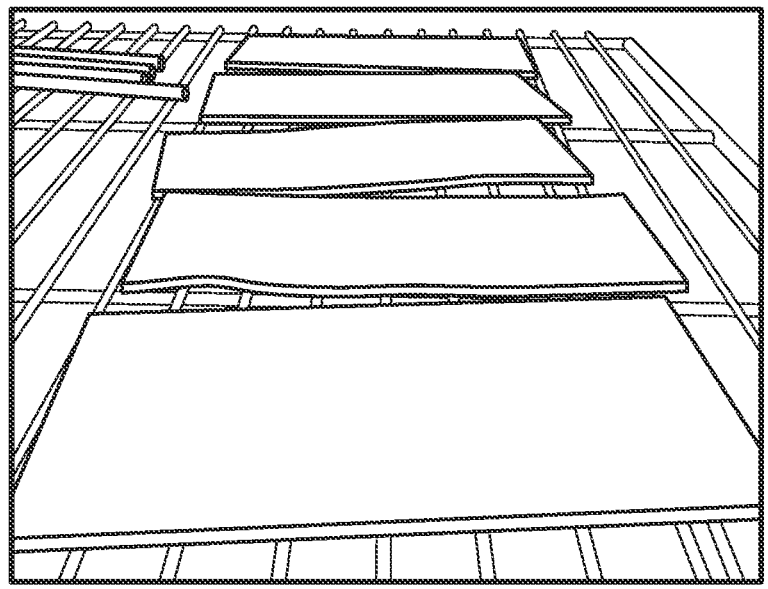
FIG. 4 is an image of a control sample sheet of a traditional PVC material and exemplary sheets of PVC material.

FIG. 4 shows an image of a control sample sheet of a traditional PVC material and exemplary sheets of PVC material. The sheets were exposed to high humidity conditions (60 degrees Celsius/70% RH) for 84 days, or a 3 year equivalent. The control sheet (bottom) formed from a traditional PVC material having an aliphatic polyester plasticizer [poly(1,4-butylene adipate)] exuded the plasticizer under these conditions. The droplets of the exuded plasticizer are visible. The exemplary sheets formed from a PVC material having a suitable non-phthalate plasticizer (dioctyl terephthalate (DOTP)) did not exude the plasticizer under these conditions.

Figure 5:
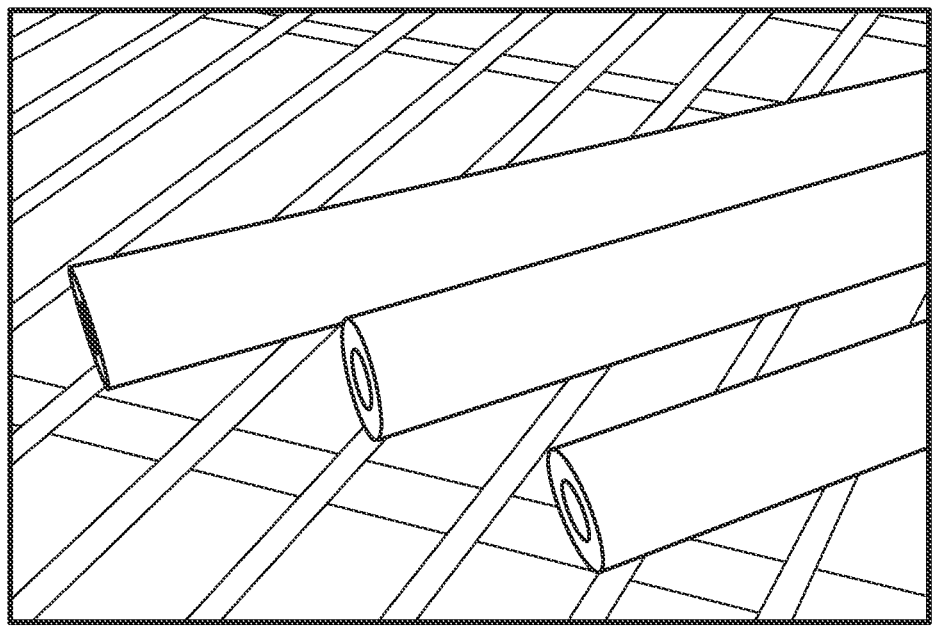
FIG. 5 is an image of a control multilayer tubing construction and exemplary embodiments of multilayer tubing constructions.

FIG. 5 shows an image of a control multilayer tubing construction and exemplary embodiments of multilayer tubing constructions 100, 200. The multilayer tubing constructions were exposed to high humidity conditions (60 degrees Celsius/70% RH) for 84 days, or a 3 year equivalent. The control multilayer tubing construction (top) having an outer layer formed from a traditional PVC material having an aliphatic polyester plasticizer [poly(1,4-butylene adipate)] exuded the plasticizer under these conditions. After just two weeks under these conditions, a film of liquid had formed on the surface of the control multilayer tubing construction. The control multilayer tubing construction also exhibited a change in glass transition temperature from 57 degrees Celsius to 90 degrees Celsius, an increase in hardness from 72.9 to 80.9, and an increase in specific gravity from 1.31 to 1.33, which are consistent with the formation of an unplasticized PVC phase as a result of plasticizer loss. Further, the loss of plasticizer causes the outer layer to shrink, thereby causing delamination of the control multilayer tubing construction. The control multilayer tubing construction has delaminated, and the fluoropolymer liner can be seen protruding from the outer layer. However, the exemplary embodiments of multilayer tubing constructions 100, 200 did not exude plasticizer under these conditions. The exemplary embodiments of multilayer tubing constructions 100, 200 also did not delaminate.

In still other embodiments, the multilayer tubing construction 100, 200 and/or the method 300 of forming a multilayer tubing construction 100, 200 may include one or more of the following items:

Embodiment 1. A multilayer tubing construction, comprising: an inner layer; an intermediate layer; and a third layer formed from a material comprising a non-phthalate plasticizer.

Embodiment 2. The multilayer tubing construction of embodiment 1, wherein the inner layer is formed from a fuel resistant material.

Embodiment 3. The multilayer tubing construction of embodiment 2, wherein the inner layer is formed from a fluoropolymer.

Embodiment 4. The multilayer tubing construction of embodiment 3, wherein the inner layer is formed from a polyvinylidene difluoride (PVDF) polymer, a PVDF copolymer, or a terpolymer such as THV.

Embodiment 5. The multilayer tubing construction of any of embodiments 1 to 4, wherein the intermediate layer is formed from a thermoplastic polyurethane (TPU), an ethylene acrylate copolymer such as Lotader® AX8900, PVDF, THV, or a PVDF/THV copolymer.

Embodiment 6. The multilayer tubing construction of any of embodiments 1 to 5, wherein the third layer is formed from polyvinyl chloride (PVC), a plasticized PVC material, a humidity resistant PVC, an oil resistant PVC, or a TPU.

Embodiment 7. The multilayer tubing construction of any of embodiments 1 to 6, wherein the non-phthalate plasticizer comprises trioctyl trimellitate (TOTM), dioctyl adipate (DOA), dioctyl terephthalate (DOTP), or combinations thereof.

Embodiment 8. The multilayer tubing construction of any of embodiments 1 to 7, wherein the non-phthalate plasticizer comprises at least 10 wt. %, at least 15 wt. %, at least 20 wt. %, at least 25 wt. %, at least 30 wt. %, at least 35 wt. %, at least 40 wt. %, at least 45 wt. %, at least 50 wt. %, at least 55 wt. %, or at least 60 wt. % of the total weight of the third layer.

Embodiment 9. The multilayer tubing construction of any of embodiments 1 to 8, wherein the non-phthalate plasticizer comprises not greater than 95 wt. %, not greater than 90 wt. %, not greater than 85 wt. %, not greater than 80 wt. %, not greater than 75 wt. %, not greater than 70 wt. %, not greater than 65 wt. %, not greater than 60 wt. %, not greater than 55 wt. %, not greater than 50 wt. %, not greater than 45 wt. %, or not greater than 40 wt. % of the total weight of the third layer.

Embodiment 10. The multilayer tubing construction of any of embodiments 1 to 9, wherein not greater than 50%, not greater than 45%, not greater than 40%, not greater than 35%, not greater than 30%, not greater than 25%, not greater than 20%, not greater than 15%, not greater than 10%, not greater than 5%, not greater than 4%, not greater than 3%, not greater than 2%, not greater than 1%, or not greater than 0.5% of the non-phthalate plasticizer leeches from the third layer when the multilayer tubing construction is exposed to high humidity conditions for a predetermined period of time.

Embodiment 11. The multilayer tubing construction of embodiment 10, wherein none of the non-phthalate plasticizer leeches from the third layer when the multilayer tubing construction is exposed to high humidity conditions for a predetermined period of time.

Embodiment 12. The multilayer tubing construction of any of embodiments 1 to 11, wherein a reduction in the total weight of the third layer attributed to the non-phthalate plasticizer leeching from the third layer when the multilayer tubing construction is exposed to high humidity conditions for a predetermined period of time is not greater than 25%, not greater than 20%, not greater than 15%, not greater than 10%, not greater than 9%, not greater than 8%, not greater than 7%, not greater than 6%, not greater than 5%, not greater than 4%, not greater than 3%, not greater than 2%, not greater than 1%, or not greater than 0.5%.

Embodiment 13. The multilayer tubing construction of embodiment 12, wherein there is no reduction in the total weight of the third layer when the multilayer tubing construction is exposed to high humidity conditions for a predetermined period of time.

Embodiment 14. The multilayer tubing construction of any of embodiments 1 to 13, wherein a change in the glass transition temperature (Tg) of the third layer is not greater than 40 degrees Celsius, not greater than 35 degrees Celsius, not greater than 30 degrees Celsius, not greater than 25 degrees Celsius, not greater than 20 degrees Celsius, not greater than 15 degrees Celsius, not greater than 10 degrees Celsius, or not greater than 5 degrees Celsius when the multilayer tubing construction is exposed to high humidity conditions for a predetermined period of time.

Embodiment 15. The multilayer tubing construction of embodiment 14, wherein there is no change in the glass transition temperature (Tg) of the third layer when the multilayer tubing construction is exposed to high humidity conditions for a predetermined period of time.

Embodiment 16. The multilayer tubing construction of any of embodiments 1 to 15, wherein the non-phthalate plasticizer prevents delamination between the layers when the multilayer tubing construction is exposed to high humidity conditions for a predetermined period of time.

Embodiment 17. The multilayer tubing construction of any of embodiments 10 to 16, wherein the high humidity conditions comprises at least 60% relative humidity (RH), at least 65% RH, at least 70% RH, or at least 75% RH at a temperature of at least 30 degrees Celsius, at least 40 degrees Celsius, at least 50 degrees Celsius, at least 60 degrees Celsius, or at least 70 degrees Celsius, and wherein the predetermined period of time is at least 60 days, at least 75 days, at least 90 days, at least 120 days, at least 180 days, at least 1 year, at least 2 years, at least 3 years, at least 4 years, at least 5 years, or at least 10 years.

Embodiment 18. The multilayer tubing construction of any of embodiments 1 to 17, wherein the inner layer, the intermediate layer, and the third layer are coextruded.

Embodiment 19. The multilayer tubing construction of any of embodiments 1 to 18, wherein the multilayer tubing construction comprises a peel force of at least 6 pounds per inch (lb./in.), at least 7 lb./in., at least 8 lb./in., at least 9 lb./in., at least 10 lb./in., at least 11 lb./in., or at least 12 lb./in.

Embodiment 20. The multilayer tubing construction of any of embodiments 1 to 19, further comprising: a fourth layer disposed over the third layer.

Embodiment 21. The multilayer tubing construction of embodiment 20, wherein the fourth layer is formed from an oil resistant material.

Embodiment 22. The multilayer tubing construction of embodiment 21, wherein the fourth layer is formed from an oil resistant plasticized PVC material, a humidity resistant PVC, or any other suitable material such as a thermoplastic polyurethane (TPU), a thermoplastic elastomer (TPE), a co-polyester thermoplastic elastomer (COPE), or a copolyamide thermoplastic elastomer (COPA).

Embodiment 23. The multilayer tubing construction of any of embodiments 20 to 22, wherein the fourth layer is coextruded with the inner layer, the intermediate layer, and the third layer.

Embodiment 24. The multilayer tubing construction of any of embodiments 20 to 23, wherein the multilayer tubing construction comprises a peel force of at least 6 pounds per inch (lb./in.), at least 7 lb./in., at least 8 lb./in., at least 9 lb./in., at least 10 lb./in., at least 11 lb./in., or at least 12 lb./in.

Embodiment 25. The multilayer tubing construction of any of embodiments 1 to 24, wherein the inner layer comprises a fuel evaporation rate of less than 20 grams per square meter per day ($g/m^2/day$), less than 15 $g/m^2/day$, less than 10 $g/m^2/day$, less than 9 $g/m^2/day$, less than 8 $g/m^2/day$, less than 7 $g/m^2/day$, less than 6 $g/m^2/day$, less than 5 $g/m^2/day$, less than 4 $g/m^2/day$, or even less than 3 $g/m^2/day$.

Embodiment 26. The multilayer tubing construction of embodiment 25, wherein the inner layer comprises a wall thickness of at least 0.003 inches, at least 0.004 inches, at least 0.005 inches, at least 0.006 inches, at least 0.007 inches, at least 0.0008 inches, at least 0.009 inches, or at least 0.010 inches.

Embodiment 27. The multilayer tubing construction of embodiment 26, wherein the inner layer comprises a polyvinylidene difluoride (PVDF) polymer or a PVDF copolymer having a wall thickness of at least 0.011 inches for an application requiring a fuel evaporation rate of less than 15 $g/m^2/day$.

Embodiment 28. The multilayer tubing construction of embodiment 26, wherein the inner layer comprises a polyvinylidene difluoride (PVDF) polymer or a PVDF copolymer having a wall thickness of at least 0.021 inches for an application requiring a fuel evaporation rate of less than 5 $g/m^2/day$.

Embodiment 29. The multilayer tubing construction of embodiment 26, wherein the inner layer comprises a terpolymer such as THV having a wall thickness of at least 0.003 inches for an application requiring a fuel evaporation rate of less than 15 $g/m^2/day$.

Embodiment 30. The multilayer tubing construction of embodiment 26, wherein the inner layer comprises a terpolymer such as THV having a wall thickness of at least 0.007 inches for an application requiring a fuel evaporation rate of less than 5 $g/m^2/day$.

Embodiment 31. A method of forming a multilayer tubing construction, comprising: extruding an inner layer of a polyvinylidene difluoride (PVDF) polymer or copolymer; coextruding an intermediate layer of a thermoplastic polyurethane (TPU) over the inner layer; and coextruding an third layer of a polyvinyl chloride (PVC) comprising a non-phthalate plasticizer over the intermediate layer.

Embodiment 32. The method of embodiment 31, wherein the non-phthalate plasticizer comprises trioctyl trimellitate (TOTM), dioctyl adipate (DOA), dioctyl terephthalate (DOTP), or combinations thereof.

Embodiment 33. The method of any of embodiments 31 to 32, wherein the non-phthalate plasticizer comprises at least 10 wt. %, at least 15 wt. %, at least 20 wt. %, at least 25 wt. %, at least 30 wt. %, at least 35 wt. %, at least 40 wt. %, at least 45 wt. %, at least 50 wt. %, at least 55 wt. %, or at least 60 wt. % of the total weight of the third layer.

Embodiment 34. The method of any of embodiments 31 to 33, wherein the non-phthalate plasticizer comprises not greater than 95 wt. %, not greater than 90 wt. %, not greater than 85 wt. %, not greater than 80 wt. %, not greater than 75 wt. %, not greater than 70 wt. %, not greater than 65 wt. %, not greater than 60 wt. %, not greater than 55 wt. %, not greater than 50 wt. %, not greater than 45 wt. %, or not greater than 40 wt. % of the total weight of the third layer.

Embodiment 35. The method of any of embodiments 31 to 34, wherein not greater than 50%, not greater than 45%, not greater than 40%, not greater than 35%, not greater than 30%, not greater than 25%, not greater than 20%, not greater than 15%, not greater than 10%, not greater than 5%, not greater than 4%, not greater than 3%, not greater than 2%, not greater than 1%, or not greater than 0.5% of the non-phthalate plasticizer leeches from the third layer when the multilayer tubing construction is exposed to high humidity conditions for a predetermined period of time.

Embodiment 36. The method of embodiment 35, wherein none of the non-phthalate plasticizer leeches from the third layer when the multilayer tubing construction is exposed to high humidity conditions for a predetermined period of time.

Embodiment 37. The method of any of embodiments 31 to 36, wherein a reduction in the total weight of the third layer attributed to the non-phthalate plasticizer leeching from the third layer when the multilayer tubing construction is exposed to high humidity conditions for a predetermined period of time is not greater than 25%, not greater than 20%, not greater than 15%, not greater than 10%, not greater than 9%, not greater than 8%, not greater than 7%, not greater than 6%, not greater than 5%, not greater than 4%, not greater than 3%, not greater than 2%, not greater than 1%, or not greater than 0.5%.

Embodiment 38. The method of embodiment 37, wherein there is no reduction in the total weight of the third layer when the multilayer tubing construction is exposed to high humidity conditions for a predetermined period of time.

Embodiment 39. The method of any of embodiments 31 to 38, wherein a change in the glass transition temperature (Tg) of the third layer is not greater than 40 degrees Celsius, not greater than 35 degrees Celsius, not greater than 30 degrees Celsius, not greater than 25 degrees Celsius, not greater than 20 degrees Celsius, not greater than 15 degrees Celsius, not greater than 10 degrees Celsius, or not greater than 5 degrees Celsius when the multilayer tubing construction is exposed to high humidity conditions for a predetermined period of time.

Embodiment 40. The method of embodiment 39, wherein there is no change in the glass transition temperature (Tg) of the third layer when the multilayer tubing construction is exposed to high humidity conditions for a predetermined period of time.

Embodiment 41. The method of any of embodiments 31 to 40, wherein the non-phthalate plasticizer prevents delamination between the layers when the multilayer tubing construction is exposed to high humidity conditions for a predetermined period of time.

Embodiment 42. The method of any of embodiments 35 to 41, wherein the high humidity conditions comprises at least 60% relative humidity (RH), at least 65% RH, at least 70% RH, or at least 75% RH at a temperature of at least 30 degrees Celsius, at least 40 degrees Celsius, at least 50 degrees Celsius, at least 60 degrees Celsius, or at least 70 degrees Celsius, and wherein the predetermined period of time is at least 60 days, at least 75 days, at least 90 days, at least 120 days, at least 180 days, at least 1 year, at least 2 years, at least 3 years, at least 4 years, at least 5 years, or at least 10 years.

Embodiment 43. The method of any of embodiments 31 to 42, further comprising: coextruding a fourth layer over the third layer.

Embodiment 44. The method of embodiment 43, wherein the fourth layer is formed from an oil resistant material.

Embodiment 45. The method of embodiment 44, wherein the fourth layer is formed from an oil resistant plasticized PVC material, a humidity resistant PVC, or any other suitable material such as a thermoplastic polyurethane (TPU), a thermoplastic elastomer (TPE), a co-polyester thermoplastic elastomer (COPE), or a copolyamide thermoplastic elastomer (COPA).

Embodiment 46. The method of any of embodiments 31 to 45, wherein the multilayer tubing construction comprises a peel force of at least 6 pounds per inch (lb./in.), at least 7 lb./in., at least 8 lb./in., at least 9 lb./in., at least 10 lb./in., at least 11 lb./in., or at least 12 lb./in.

Embodiment 47. The method of any of embodiments 31 to 46, wherein the inner layer comprises a fuel evaporation rate of less than 20 grams per square meter per day ($g/m^2$/day), less than 15 $g/m^2$/day, less than 10 $g/m^2$/day, less than 9 $g/m^2$/day, less than 8 $g/m^2$/day, less than 7 $g/m^2$/day, less than 6 $g/m^2$/day, less than 5 $g/m^2$/day, less than 4 $g/m^2$/day, or even less than 3 $g/m^2$/day.

Embodiment 48. The method of embodiment 47, wherein the inner layer comprises a wall thickness of at least 0.003 inches, at least 0.004 inches, at least 0.005 inches, at least 0.006 inches, at least 0.007 inches, at least 0.0008 inches, at least 0.009 inches, or at least 0.010 inches.

Embodiment 49. The method of embodiment 48, wherein the inner layer comprises a polyvinylidene difluoride (PVDF) polymer or a PVDF copolymer having a wall thickness of at least 0.011 inches for an application requiring a fuel evaporation rate of less than 15 $g/m^2$/day.

Embodiment 50. The method of embodiment 48, wherein the inner layer comprises a polyvinylidene difluoride (PVDF) polymer or a PVDF copolymer having a wall thickness of at least 0.021 inches for an application requiring a fuel evaporation rate of less than 5 $g/m^2$/day.

Embodiment 51. The method of embodiment 48, wherein the inner layer comprises a terpolymer such as THV having a wall thickness of at least 0.003 inches for an application requiring a fuel evaporation rate of less than 15 $g/m^2$/day.

Embodiment 52. The method of embodiment 48, wherein the inner layer comprises a terpolymer such as THV having a wall thickness of at least 0.007 inches for an application requiring a fuel evaporation rate of less than 5 $g/m^2$/day.

This written description uses examples to disclose the embodiments, including the best mode, and also to enable those of ordinary skill in the art to make and use the invention. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:
1. A multilayer tubing construction, comprising:
an inner layer;

an intermediate layer comprising thermoplastic polyurethane (TPU), an ethylene acrylate copolymer, PVDF, THV, or a PVDF/THV copolymer; and a third layer formed from a polyvinyl chloride (PVC) material comprising a non-phthalate plasticizer, wherein the non-phthalate plasticizer comprises dioctyl terephthalate (DOTP), wherein thermoplastic polyurethane (TPU), an ethylene acrylate copolymer, PVDF, THV, or a PVDF/THV copolymer of the intermediate layer covers the inner layer around 360° of a circumference of the inner layer.

2. The multilayer tubing construction of claim 1, wherein the inner layer is formed from a fuel resistant material.

3. The multilayer tubing construction of claim 2, wherein the inner layer is formed from a fluoropolymer.

4. The multilayer tubing construction of claim 3, wherein the inner layer is formed from a polyvinylidene difluoride (PVDF) polymer, a PVDF copolymer, or a terpolymer.

5. The multilayer tubing construction of claim 1, wherein the intermediate layer is formed from a thermoplastic polyurethane (TPU).

6. The multilayer tubing construction of claim 1, wherein the non-phthalate plasticizer comprises at least 10 wt. % and not greater than 95 wt. % of the total weight of the third layer.

7. The multilayer tubing construction of claim 1, wherein a reduction in the total weight of the third layer attributed to the non-phthalate plasticizer leeching from the third layer when the multilayer tubing construction is exposed to high humidity conditions for at least 60 days is not greater than 25%.

8. The multilayer tubing construction of claim 1, wherein a change in the glass transition temperature (Tg) of the third layer is not greater than 40 degrees Celsius when the multilayer tubing construction is exposed to high humidity conditions for at least 60 days.

9. The multilayer tubing construction of claim 8, wherein the inner layer, wherein not greater than 50% of the non-phthalate plasticizer leeches from the third layer when the multilayer tubing construction is exposed to high humidity conditions for at least 60 days, wherein the high humidity conditions comprises at least 60% relative humidity (RH) at a temperature of at least 30 degrees Celsius.

10. The multilayer tubing construction of claim 1, wherein the non-phthalate plasticizer prevents delamination between the layers when the multilayer tubing construction is exposed to high humidity conditions for at least 60 days.

11. The multilayer tubing construction of claim 1, wherein the inner layer, the intermediate layer, and the third layer are coextruded.

12. The multilayer tubing construction of claim 1, wherein the multilayer tubing construction comprises a peel force of at least 6 pounds per inch (lb./in.).

13. The multilayer tubing construction of claim 1, further comprising: a fourth layer disposed over the third layer.

14. The multilayer tubing construction of claim 13, wherein the fourth layer is formed from an oil resistant material.

15. The multilayer tubing construction of claim 1, wherein the inner layer comprises a fuel evaporation rate of less than 20 grams per square meter per day ($g/m^2$/day).

16. The multilayer tubing construction of claim 15, wherein the inner layer comprises a wall thickness of at least 0.003 inches.

17. A method of forming a multilayer tubing construction, comprising:
extruding an inner layer of a polyvinylidene difluoride (PVDF) polymer or copolymer;
coextruding an intermediate layer of a thermoplastic polyurethane (TPU) over the inner layer, wherein the thermoplastic polyurethane (TPU) of the intermediate layer covers the inner layer around 360° of a circumference of the inner layer; and
coextruding an third layer of a polyvinyl chloride (PVC) comprising a non-phthalate plasticizer over the intermediate layer, wherein the non-phthalate plasticizer comprises dioctyl terephthalate (DOTP).

18. The method of forming a multilayer tubing construction of claim 17, wherein the inner layer, wherein not greater than 50% of the non-phthalate plasticizer leeches from the third layer when the multilayer tubing construction is exposed to high humidity conditions for at least 60 days, wherein the high humidity conditions comprises at least 60% relative humidity (RH) at a temperature of at least 30 degrees Celsius.

* * * * *